Sept. 7, 1954 J. S. BROWN 2,688,444

MAGNETIC COMPASS COURSE CALCULATOR

Filed March 9, 1953 2 Sheets-Sheet 1

INVENTOR
JAMES S. BROWN
BY
Frederick E. Bromley
ATTORNEY

MAGNETIC COMPASS COURSE CALCULATOR

Filed March 9, 1953 2 Sheets-Sheet 2

INVENTOR
JAMES S. BROWN
BY
Frederick C. Bromley
ATTORNEY

Patented Sept. 7, 1954

2,688,444

UNITED STATES PATENT OFFICE 2,688,444

MAGNETIC COMPASS COURSE CALCULATOR

James Sinclair Brown, Toronto, Ontario, Canada

Application March 9, 1953, Serial No. 341,310

4 Claims. (Cl. 235—88)

The invention relates to calculators of the type designed to facilitate the rapid direct reading of an information which is a discreet modification of an observed information.

In a characteristic field of utility, the invention is directed to a course calculator for use in connection with a navigator's magnetic compass, or a pelorus.

Course calculators, directed toward similar objectives, are well known. For example, it is known to provide a set of tables of deviation which may be used in conjunction with a sort of abac sometimes called a Napier Diagram.

Other types of abac are also known and used, for example, in connection with loran and shoran observations from data received by radio and coordinated on a chart containing references to magnetic bearings.

These prior art devices, in common with similar devices directed to other fields of calculation, all suffer from the common fault that considerable time is required to make the interpolations and to set the cursor lines, to refer to tables of error, and the like.

The movement of mobile agencies such as ships, aircraft and the like has recently been greatly speeded up with the result that a mobile agency may travel a considerable distance while the navigator is preparing the modified data to correct a bearing: in many cases the mobile agency may have gone far off course before the true bearing information has become available to the pilot and this necessitates a complete re-take of information and a roundabout return to course.

It is often necessary to reduce speed during the calculating interval in order to prevent the mobile agency from inadvertently entering an area that is dangerous or prohibited.

In all fields of mathematical method, a true course calculator should be direct-reading so that reference to interpolative information in the form of side-tables is unnecessary. This has not been achieved heretofore.

As is well known to those skilled in the art of navigation there are certain errors characteristic of observed bearings which must be corrected in order to obtain a true bearing.

These errors stem from two main sources. First, from an error in the magnetic bearing itself, and second, from an error imposed upon the compass by the influence of magnetic fields local to the said compass.

It has long been known to "compensate" a magnetic compass for errors due to the magnetic field distortion caused by a ship's hull or the like.

Known means to this end are only an expedient and do not completely correct the compass deviation from "true magnetic" for all angles of deviation from magnetic "north." When the compass has been "corrected," there is still some error left which the navigator tries to "carry in his head" or which he keeps as a note in his log—a habit not conducive to exactness in navigation. Some attempt has been made in the past to provide interpolation tables showing the amount of error for each compass point, or for each interval of a predetermined number of degrees of deviation from magnetic north, but here again we have reference tables which consume time in search of items and in subsequent insertion of the modification in a mathematical calculation.

There are also tables of modification which are used to correct the magnetic bearing itself. A mobile agency cannot reach point B, exactly, in its transit from point A by any other means than a true geometric bearing. If the bearing is incorrect the agency will go off course if directed by such information. Elaborate tables have been set up showing the error in magnetic bearing with respect to the true geometric bearing. These tables, over many hundreds of years, have been developed to a very high standard of accuracy and are frequently incorporated in course navigator tables, and the like.

However, despite the great effort heretofore expended in the endeavor to provide accurate information, prior art agencies are not only time-consuming in operation but are also capable of being incorrectly interpreted. For example, a navigator working hastily against time may (and frequently does) confuse the meanings of the dotted and solid lines on a Napier chart. Errors as great as 200 per cent can issue from such inadvertence. It is a fact that such errors have been found even in the official answers to examination questions on navigation in papers set by official examiners.

The applicant has discovered that it is possible to provide a course calculator wherein errors due to agencies external to a magnetic compass can be exactly compensated by the direct-visual modification of a course calculator combined with an error-graph superimposed thereon.

By this novel method, any predetermined known tabulated error correction can be set down as a continuous mathematical variable and a calculator can then be arranged to provide basic informations set down on slide-calculators of which at least one member displays the correction-graph.

Applied to navigation, cursors, verniers, and lubberlines are included as part of the course calculator information to provide quick reading of a bearing in relation to the "heading" of a mobile agency and so, true geometric course bearings can be read off in a matter of seconds without reference to tables and without recourse to numerical calculations.

A construction in accordance with this novel method may comprise a course calculator displaying a plurality of digits of basic informations, means for indexing each respective digit of another information, against a desired digit of another information, means for indexing one or both of these informations against a desired digit of some further basic information, a graphic correction factor display fixedly associated with at least one course calculator display of said basic information, a calibrated and moveable radius-cursor capable of continuously intersecting the said correction factor display, means for presetting the physical relationship of the said calibrated radius-cursor with that of the said means for indexing a selected combination of the said basic plurality of digits of basic informations, means for locking up two or more of the indexed digits excepting that including the correction factor display, and means for indexing the locked up indexed digits against a selected digit of the course calculator display which is fixedly associated with said correction factor graphic display.

As previously intimated, the teachings of the invention have been inspired by the study of a particular problem relating to navigation.

In order to further elucidate these teachings the invention will therefore be described as to both method and substance by an example comprising a course calculator specifically directed to the procedures involved in navigating a mobile agency such, for example, as a ship.

In the selected example a circular form of course calculator has been chosen, partly because of its inherent convenience and partly because such a form facilitates the simulation of a compass card or rose, or a pair of roses concentrically arranged and providing one or more sets of digits of basic information. Such a display makes it easy to pictorially co-relate an actual magnetic compass rose with those of the course calculator, and to synchronize the indexing thereof with arbitrary variations in the said compass.

In the following description the method of applying the novel principle will be elucidated by reference to a typical example of construction, the ascertainment being further facilitated by reference to the accompanying drawings wherein.

Figure 1:
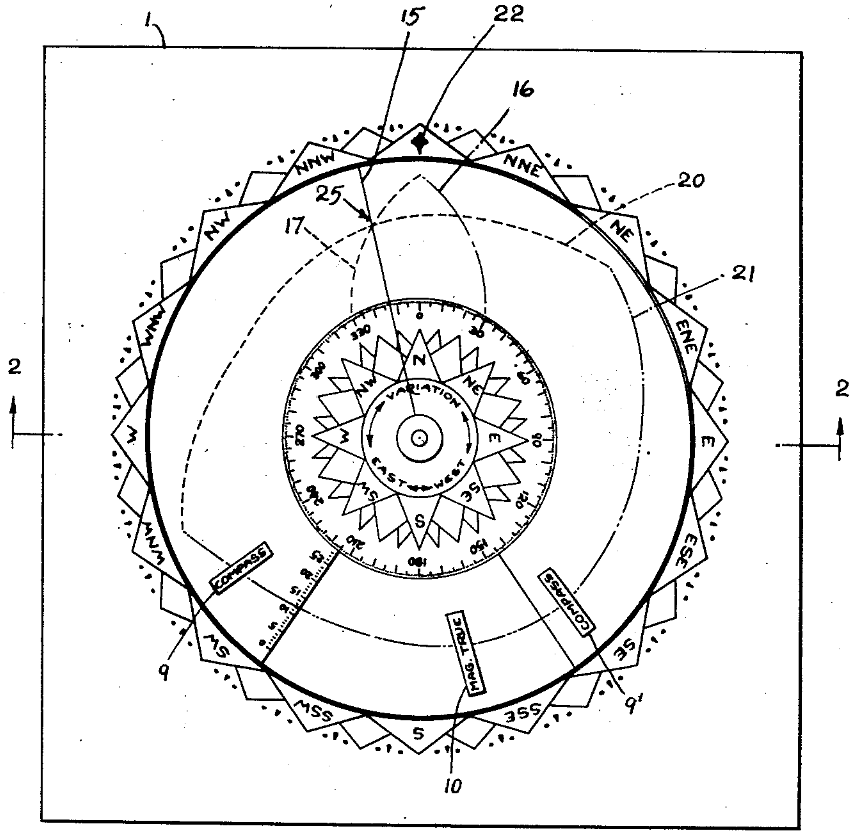
Figure 1 represents pictorially, a calculator designed to facilitate a determination of a corrected bearing in accordance with the method governed by the principles invoked by the present teachings.
Figure 2:
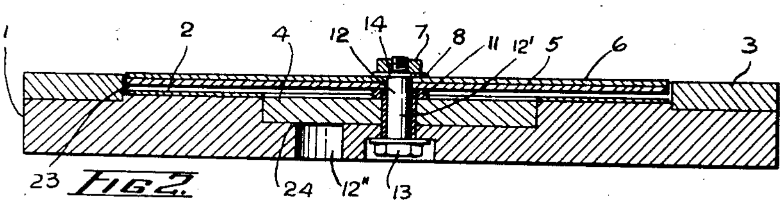
Figure 2 depicts a section along the lines 2—2 of Figure 1.
Figure 3:
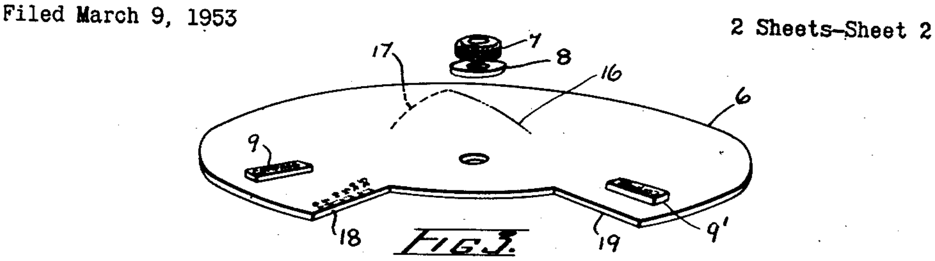
Figure 3 depicts, pictorially, one rotatable member of the course calculator containing certain reference digits the derivation of which will be later explained.
Figure 4:
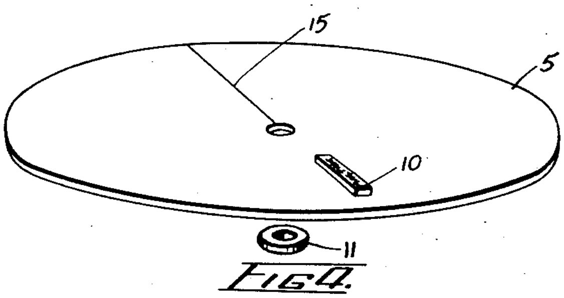
Figure 4 depicts, picotrially, a second rotatable course calculator member containing a bench mark or cursor digit.
Figure 5:
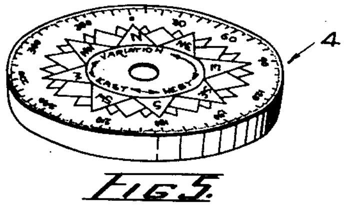
Figure 5 depicts, pictorially, a conventional compass rose typically in accordance with that found in a binnacle or pelorus.
Figures 6, 7:
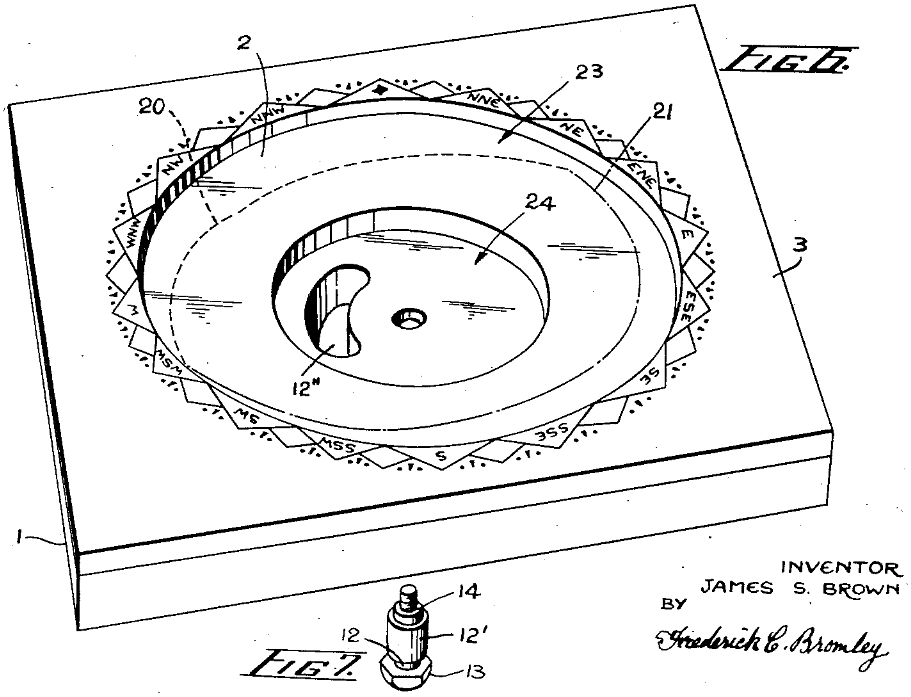
Figure 6 depicts, pictorially, a base containing recesses to accommodate the rotatable members of the course calculator and is seen to contain also a lubberline and a graphic display of two error correction curves plotted along polar co-ordinates within the bounds of an annular space separating an outer bearing rose and an inner rose simulating a magnetic compass rose.
Figure 7 depicts an assembly of a bolt, washers and clamping thread, representing one manner of holding the various parts of the device in proper relation for use.

It will be evident from inspection of the drawings generally that Figures 3 to 7 inclusive display, in combination, an isometric explosion of the assembly depicted in Figures 1 and 2.

Referring now to these drawings, 1 is a base board of said stable material. It contains a recess 24 to neatly but rotatably nest a disc 4 and a recess 23 designed to rotatably nest discs 5 and 6.

Part 2 is a surface of durable smooth character and of a tone suited to sharply define a graph depicted thereupon.

Part 3 is a cover of transparent material which has been routed out to form the recess 23. An outer bearing rose may be imprinted on either the bottom or top surface around the circular routing. This rose could, of course, be suitably imprinted upon the upper surface of part 2 instead.

Part 4 is the inner rose and has been shown as comprising a simulated compass card including the 360 degrees quadrantal, and "point" scale digits in combination. The base 1 is fitted at the intersection of its diagonals with a bolt 12 and this forms the axis point of rotation of all the rotary scale members of the course calculator. The compass-rose contains a central aperture whereby this disc is centred over bolt 12 within recess 24 in base 1. If desired, a key or flat may be associated with the rose disc and with a free running collar 12′ on bolt 12 so that the rose can be independently rotated within the base 1 by any suitable means such as by inserting a finger of the user's hand in the arcuate slot 12″, or by a handle element on said collar.

The bolt includes shoulders such as 14 for limiting the excursion of washers and clamp nuts 11, 8 and 7, in connection with a clamping operation to be referred to later in the discussion. The part 4 compass rose is to be employed to indicate "True" direction as will be explained later.

This course calculator could be arranged to include an independent graphic display containing local navigation correction of error data resulting from observed known distortions of the earth's magnetic field. Such data could be independently incorporated on the "rose" diagram but since the inclusion of such a feature would complicate the description very greatly, a straight composite compass rose has been shown and is to be used in conjunction with the lubberline on part 2 to set error variations for any given locality from charted data.

Settings for westerly variations are accomplished by clockwise rotation of part 4 and for easterly variations by counter-clockwise rotation thereof. The indexing for lubberline versus deviation is one setting of the course calculator.

Part 5 is a transparent disc which nests in recess 23 and rotates about spindle bolt 12. It contains a bench-mark or cursor line 15 and in line of diameter therewith a knob 10 for convenience in effecting certain necessary rotations of this member. In manipulation of the calculator the information supplied by this cursor will be indexed to other members of the course calculator family of digits to solve the calculation of "True" and "Magnetic" directions.

Part 6 is a preferably transparent disc similar in dimensions to part 5. Part of this disc is cut away as shown, for example, in Figure 3, and the cut away provides two radial edges 18, 19. The angle which these radials make with the centre depends upon how much range of observation is desired for each setting of the instrument. In a navigation calculator usually 60 degrees is regarded as sufficient. In the present case therefore the radial edges 18, 19 have been arranged to include an angle 60 degrees plus a few degrees extra to give clearance for the knob 10. The parts 5 and 6 are assembled together one upon the other and 5 must be able to swing 30 degrees each side of a predetermined radial without bumping its knob against edges 18, or 19.

Two fingering knobs 9, 9' are shown on part 6 for convenience in rotating that member.

Part 6 also displays two arcuate lines 16, 17 which intersect at a point on the outer edge of the disc. This point of intersection should lie on a diameter of the disc which bisects the angle enclosed by the radials 18, 19. The other point of intersection of the arcuate lines 16, 17 is the centre of the assembly. The lines 16, 17 are shown thus merely as an example. They may have other forms. The size of these arcs governs the range of errors that can be plotted and read conveniently with accuracy. This range can be estimated as one half the angle subtended by that part of either arc that extends between the circumfeernces of the inner and outer roses. From the outer rose the arcuate lines need not be projected beyond the circumference of the inner rose.

The arcuate line whose centre would be to the right of a common chord may be, say, red in color and will be associated in readings with "Direction West." The complementary arcuate line may be of green color and will be associated in readings with "Direction East."

The point of intersection of the arcuate lines at the circumference of the part 6 will form an index to line up with "Compass Heading."

Radius edge 18 is calibrated in a manner to be described and functions as a polar cursor to variably intersect the error graphs 20, 21. The calibrations on this edge 18 (which, desirably, is bevelled) will be hereinafter referred to as the "Plotting Scale."

The various parts of the calculator are assembled in the order shown on the isometric group of drawings, Figures 3 to 7 inclusive. These are normally loosely held together by bolt 12, washers 8, 11, and nut 7. In the unclamped position all the members of the course calculator are rotatable except the outer rose and the graph lines 20, 21. The lubberline of the outer rose is in practice permanently lined up with the ship's keel so that it represents always the true heading of the vessel.

It is desirable to provide some means for shifting the angular position of the rose 4 in accordance with the magnetism variation for any given locality. This may take the form previously suggested, namely, a keyed sleeve rotatable upon the bolt 12, or, additionally, means may be provided for synchronizing this rose with the compass rose by means of master and slave motors or other known means.

In any event, for the present embodiment, the two parts 5 and 6 will, at one stage in the calculation, be required to assume a fixed predetermined relationship and then be capable of being rotated as a unit with reference to the graphs 20, 21.

The washers 11, 8 and nut 7, together with a suitable shoulder on bolt 12 provide a means for clamping discs 5 and 6 together. In some cases it may be desirable to clamp the rose to the parts 5 and 6 also which would involve two degrees of clamping pressure on the nut 7 or else the absence of a shoulder on bolt 12, which would clamp all three parts together if washer 11 were shifted to the bottom of the recess in part 1. It is evident that the design of bolt 12 and its accessories is a matter of expedient, depending on just what elements of the abac may be required, for a particular calculation, to "lock-up" for a major indexing move.

As supplied to the field of utility, the calculator may not have the graph display 20, 21 incorporated, or alternatively, this graph may be drawn in situ by a vendor or his agent as part of the service supplied under the terms of sale.

The graphs 20, 21 are desired by the user as a means of correction for a magnetic bearing which has been subjected to a complex pattern of polar deviations as a result of unavoidable magnetic field distortion caused by agencies within the ship itself, or by agencies so close to the ship as to be regarded by charting authorities as unsuited for incorporation in standard published direction tables: the embodiment of method now to be described will assume that the graph required is of this latter type.

At this point it is essential to provide some explanation of the deviation of course calculator digits comprised within the curves 16, 17, and the plotting scale 18.

The plotting scale graduations are established at the points of intersection of radial 18 and arcs of magnitude equal to the arcs of deviation. Their centres are located on the circumference of the circle whose centre is that of the outer rose and whose circumference passes through centres of the arcs of deviation. Centres are spaced one degree or less apart depending upon the accuracy of reading desired. The hypothetical arcs of magnitude are indicated by their points of intersection with radial 18 by suitably engraved calibration marks. Later on these calibrations will selectively intersect the polar graphs of error shown as 20, 21 on part 2.

Using the maximum of 30 degrees as a basis of illustration, the arcs of deviation 16, 17 will be found on a chord of the outer rose whose arc subtends an angle of 120 degrees at the centre. As already noted in other words, they will be located one on either side of the radius of the outer rose that bisects the chord and at such a distance from this radius that the angle subtended by the position of the arc between the circumferences of the roses is 60 degrees.

Using the plotting scale edge 18 as the radius that bisects the said chord of the outer rose, the initial deviation curve coincides in intersection with the outer rose and the radius. This is zero datum on the plotting scale. The arc of the same magnitude, whose centre is on the circumference line of the outer rose and intersects the outer rose one degre from zero, also intersects the radius edge 18 and at this point the scale is calibrated as 1 degree. Moving the centre of the arc each degree or predetermined fraction thereof around this line of centres enables the plotting scale to be correspondingly calibrated, up to 30 degrees which point will, in this embodiment, coincide with the circumference of the inner rose, or in other words, will use up all the space available on edge 18, and completely traverse the annular space on part 2 reserved for the polar diagram of errors.

It is evident that the red and green arcs of deviation on the disc 6 having been based upon the same radius and upon the same line of centres, the linear indications about the circles enclosing the compass bearing course calculator digits have been resolved into polar coordinates upon the plotting scale and the discs 5 and 6 may be rotated to represent all such arcs of deviation upon the graph surface so that an arc intersection to a circumference has a value directly proportional to a corresponding distance in degrees along the circumference line of the outer rose between an intersection of the radius and the arc with the circumference.

Automatically the green arc pins down the reading to degrees left of the radius and the red arc reads with equal absence of any possible ambiguity a right-wise deviation.

The graphs 20, 21 when set down in the annular display card on part 2 provide the polar intercepts with the plotting scale 18 to show error corrections for any selected course calculator reading on the index of part 6 with cross reference to the cursor line index of part 5 on the outer rose, or of the cursor with the inner rose and the index point of 6 on, say, the outer rose, as required. These settings will be pinned down to a specific case later on.

In order to prepare the graphs 20, 21 to represent compass deviation errors in a particular installation the calculator is set up with its lubberline properly in line with the vessel's heading and, with part 5 temporarily removed (so as to get access to the annular display space by way of the notch 18—19 in part 6) the graphs 20, 21 are plotted from direct observation of errors characteristic of the particular compass and location in which the respective devices are to function in practice. In this connection a datum for the curves is established by making zero on the plotting scale coincide with the magnetic heading on the outer rose. Easterly errors may be plotted in green and westerly errors in red to provide ready distinction and comply with conventional practices.

The plotting is a simple operation. It is usual to set up a table of errors for every 15 degrees of check by "swinging the compass." The procedure for this operation is well known to those skilled in the art and need not be set down here. Of course such a table will contain 24 observations for a complete swing.

The resulting polar diagram on the display annulars of part 2 will therefore contain 24 dots plotted against the calibrations on scale 18 which correspond to the magnetic headings indicated on the outer rose when it corresponds at the junction of the arcs of deviation (on part 6) with those of the magnetic compass itself. These 24 points are then joined by a smooth line. The points of left deviation being lined in green and points of right deviation in red. At some point on the curve the color will change from green to red. If the errors pass through zero from east to west (or vice versa) the change will occur at the point where the curve reaches the circumference of the outer rose, but not otherwise.

When the graphs have been set down on part 2 the calculator is re-assembled to include the temporarily removed part 5 and the "Course Calculator Board" is ready for use.

It is clear that a Course Calculator Board comprising the present embodiment of these teachings is useful only in connection with the particular compass and in the particular location in which it has, in situ, been calibrated by the addition of the novel graphic display of the present invention. In some other field of utility such a condition might not obtain. This is a particular case.

Exemplifying a method according to the invention and referable to the foregoing example of construction, to calculate a compass course from a point of departure, and assuming that the correction curve has been drawn on part 2, the local variation is set on part 4, the inner rose.

The true course is found from the chart. The cursor line on part 5 is rotated to coincide with "True" on part 4 and this will coincide with "Magnetic" on part 3, the outer rose. Compass course is then indicated on the outer rose at the intersection of the red and green arcuates displayed on part 6, when the arc whose color corresponds to the color of the polar graph where it intersects the cursor line is rotated to coincide with this point of intersection.

When the cursor line, the graph line and the arc of the same color as the graph line all intersect (see "25" on Figure 1), the calculator is completely "set" and "true," "Magnetic" and "Compass" bearings may be read off simultaneously.

If parts 5 and 6 are now frictionally bound together by tightening nut 7, or by some similarly effective means, these parts may be rotated in fixed relation to indicate any compass bearing and "Magnetic" and "True" are also shown automatically. This is true for the reason that the deviation of a compass heading applies to any compass bearing taken on that heading.

One variant of this course calculator may employ a discretely colored cursor line on part 4 in place of the rose display. This cursor line may be used to set up "True" direction on the outer rose and be locked up with parts 5 and 6 or with either of these selectively to provide desired information about specific variations. It is evident that the centre spindle assembly could be readily modified by several selective mechanical arrangements of known type to facilitate this modification of the exemplified instruction.

Many other minor modifications of the exemplified construction will occur to those skilled in the art. For example, since any apparent error in a compass heading is in fact a deviation of the compass needle from "magnetic north," it follows that, on a moving card type of compass, the red and green arcs of deviation can be drafted on the cover glass with their point of intersection indexed to the lubberline. A transparent disc can be concentrically positioned over the needle axis and on the outer rim of the compass displaying an outer rose (as in part 2 or 3 of the exemplified case) and within it, if desired on another stacked disc, the graph of errors can be displayed as a transparency independently rotatable. In this way the invention can be "built up" around an actual compass, and the method of the invention applied directly to the self adjusting reference line of the compass needle itself as one digit of the course calculator. The turning of the vessel wil automatically find the first setting of the above and the navigator can swiftly rotate the outer rose until the intersection of the "magnetic" cursor and the graph line coincide with the appropriate arc of deviation (see 25, Figure 1). If now the vessel is turned until the compass course shown at its lubberline is the same as that shown on the outer rose at the point of intersection of the arcs of deviation, the vessel is "on course."

A similar modification employing the same broad teachings of the invention can be applied to a pelorus, thereby expanding the utility of that instrument to include measurements of both true magnetic and compass bearings.

It should be now evident that the broad teachings of the invention are applicable to a wide variety of arrangements for co-relating complex combinations of information to provide a desired resultant directive.

To all such the invention and its method are directed, and all arrangements employing the method and construction based upon the disclosed novel principle are to be regarded as lying within the ambit of the appended claims.

What is claimed is:

1. A navigational course calculator comprising a base having a compass rose and lubberline fixedly mounted thereon, a circular area within the said compass rose and concentric thereto, and having a circular well concentric thereto, a pivot extending from the center of said well, a disc bearing a second compass rose mounted on said pivot concentric with the first compass rose, a transparent disc concentric with the compass roses and having plotted thereon two radially arcuate traces having one intersection at the center of the compass roses and another intersection at a reference point on the first compass rose, and mounted for rotation on said pivot, a second transparent disc mounted for rotation on said pivot and concentric to the compass roses and having a radial cursor line thereon for indicating on said roses and intersecting said arcuate traces, a radial scale on said first transparent disc, the digits of said scale representing in polar coordinates a selected range of values on the first compass rose, and a graphic plot of error correcting data within the said circular space and disposed to continually intersect the said radial scale for all angular positions thereof.

2. A navigational course calculator of the type defined by claim 1 wherein the centres of the said radial arcuate traces are located upon a chord of the outer rose whose arc subtends an angle of 120 degrees at the centre and are located one on either side of that radius of the outer rose which bisects the said chord at 90 degrees and at such a distance from this radius that the angle subtended by the portion of the arc between the circumferences limiting the boundaries of the said annular space is 60 degrees.

3. A navigational course calculator of the type defined in claim 1 wherein the scale embraced by said radial cursor embraces within its limits graduations corresponding to 30 degrees of arc along the measuring scale of said outer rose.

4. A navigational course calculator of the type defined by claim 1 wherein the centres of the said radial arcuate traces are located upon a chord of the outer rose whose arc subtends an angle of 120 degrees at the centre and are located one on either side of that radius of the outer rose which bisects the said chord at 90 degrees.

References Cited in the file of this patent

UNITED STATES PATENTS

| Number | Name | Date |
|---|---|---|
| 1,104,844 | Sundell | July 28, 1914 |
| 2,371,714 | Slauson | Mar. 20, 1945 |
| 2,379,931 | Schaevitz | July 10, 1945 |

OTHER REFERENCES

"Navigation and Nautical Astronomy," pages 13, 41-43 and 47. Benjamin Dutton, 1943, United States Naval Institute, Annapolis, Maryland.